(12) United States Patent
Finegold

(10) Patent No.: US 10,657,697 B2
(45) Date of Patent: May 19, 2020

(54) METHOD FOR THE COMPUTER ANIMATION OF CAPTURED IMAGES

(71) Applicant: Michal Finegold, Greenwich, CT (US)

(72) Inventor: Michal Finegold, Greenwich, CT (US)

( * ) Notice: Subject to any disclaimer, the term of this patent is extended or adjusted under 35 U.S.C. 154(b) by 24 days.

(21) Appl. No.: 16/057,237

(22) Filed: Aug. 7, 2018

(65) Prior Publication Data

US 2019/0043240 A1 Feb. 7, 2019

Related U.S. Application Data

(60) Provisional application No. 62/541,976, filed on Aug. 7, 2017.

(51) Int. Cl.
| | |
|---|---|
| *G06T 13/80* | (2011.01) |
| *G06T 13/40* | (2011.01) |
| *G06F 3/0488* | (2013.01) |
| *G06T 7/20* | (2017.01) |
| *G06F 3/0484* | (2013.01) |
| *G06T 13/20* | (2011.01) |

(52) U.S. Cl.
CPC ............ *G06T 13/40* (2013.01); *G06F 3/0488* (2013.01); *G06F 3/04845* (2013.01); *G06F 3/04883* (2013.01); *G06T 7/20* (2013.01); *G06T 13/80* (2013.01); *G06T 13/205* (2013.01); *G06T 2207/10016* (2013.01); *G06T 2210/12* (2013.01); *G06T 2213/08* (2013.01)

(58) Field of Classification Search
CPC .................. G06T 13/40; G06T 13/205; G06T 2207/10016; G06T 2210/12; G06T 2213/08; G06T 7/20; G06T 13/80; G06F 3/04883; G06F 3/0488; G06F 3/04845
See application file for complete search history.

(56) References Cited

U.S. PATENT DOCUMENTS

| | | | |
|---|---|---|---|
| 2010/0289807 A1* | 11/2010 | Yu ........................ | G06F 3/04817 345/581 |
| 2012/0218262 A1* | 8/2012 | Yomdin ................. | G06T 13/40 345/419 |
| 2015/0206341 A1* | 7/2015 | Loper ..................... | G06T 17/10 345/420 |

OTHER PUBLICATIONS

Liu et al. ("Markerless Motion Capture of Interacting Characters Using Multi-view Image Segmentation", IEEE, 2011. (Year: 2011).*

* cited by examiner

*Primary Examiner* — Nicholas R Wilson
(74) *Attorney, Agent, or Firm* — Dunlap Bennett & Ludwig PLLC

(57) ABSTRACT

A method for the computer animation of captured images is provided. The computer animation of the captured image may be operatively rigged via touchscreen input or synchronized with video and audio input. During the rigging stage, the user may locate joints and pivot points and/or isolated body parts via a touchscreen. Animation may be based on, in part, motion capture from video input devices, and by using computer vision and machine learning to predict the location of the pivot points and associated body parts.

11 Claims, 4 Drawing Sheets

METHOD FOR THE COMPUTER ANIMATION OF CAPTURED IMAGES

CROSS-REFERENCE TO RELATED APPLICATION

This application claims the benefit of priority of U.S. provisional application No. 62/541,976, filed 7 Aug. 2017, the contents of which are herein incorporated by reference.

BACKGROUND OF THE INVENTION

The present invention relates to improvements of computer animation and, more particularly, a method for the computer animation of captured images, wherein the computer animation of the captured image may be operatively synchronized with video input.

Users of all ages want to create animations. Current computer implemented methods of animation, however, are not so user friendly. Specifically, current methods do not afford easy application to arbitrary images, but rather limit applications by demanding the utilization of specific markers, animation curves, or keyframes. For example, existing animation methods demand users draw frame by frame, or build and rig the objects they wish to animate in specialized ways, or create keyframes and deal with animation curves, and the like. Many of these steps have steep learning curves and involve expensive, complicated equipment. And some still do not provide a finished animation.

Moreover, "easier" types of software for animation do not provide creative control and freedom regarding how the character animates. Furthermore, existing methods do not allow utilization of "arbitrary images"—e.g., utilize a drawing created without the intention of ever animating it, and then bring it to life.

As can be seen, there is a need a method for the computer animation of captured images, wherein the computer animation of the captured image may be operatively rigged via touchscreen input and operatively synchronized with video and audio input. Thereby, users do not have to prepare their characters in any special way in advance; rather, they can animate the captured image creatively simply by moving their own body or providing the input via touchscreen. The intuitive motion capture process makes the computer implemented method very easy to use. The present invention enables users to take the desired captured image of whatever they want, easily synchronize it through the software application, and make said desired captured image computer animated with motion capture from a device camera. The present invention allows the user to get a finished animation practically in real-time, just by photographing what they want to animate, rigging through the software application, and then moving their body in front of the camera. Alternatively, users can use touch screen gestures to animate the character in real-time, moving it as they want it to animate. As a result, users do not have to prepare their characters in any special way in advance, thereby making any type of audio/visual presentation—a video, animation, presentation, fiction or nonfiction, tv show, commercial, etc.—easy to animate.

SUMMARY OF THE INVENTION

In one aspect of the present invention, a method of computer animating captured images includes obtaining a first set of rules that define one or more first nodes as a function of two or more first body parts of one or more animatable captured images; obtaining a timed data file of a moving body having one or more tracked coordinates of two or more second body parts of said moving body; evaluating the one or more tracked coordinates against the first set of rules to determine a respective tracked coordinate for each first node; and applying synchronized movement to each first node by mirroring each respective tracked coordinate to produce animation control of the one or more animatable captured images.

In another aspect of the present invention, the method of computer animating captured images includes obtaining a first set of rules that define one or more first nodes as a function of two or more first body parts of one or more animatable captured images; the first set of rules provides defining each first node through one or more touchscreen gestures; defining a relationship between two adjacent first nodes as a vector, wherein each vector establishes a relative directional orientation of the two adjacent first nodes when applying synchronized movement; and defining one or more first body parts of the animatable captured image by one or more bounding boxes defined by the one or more first nodes; obtaining a timed data file of a moving body having one or more tracked coordinates of two or more second body parts of said moving body, wherein the timed data file of a moving body is a video output of a user; evaluating the one or more tracked coordinates against the first set of rules to determine a respective tracked coordinate for each first node; and applying synchronized movement to each first node by mirroring each respective tracked coordinate to produce animation control of the one or more animatable captured images, wherein the evaluation of the one or more tracked coordinates against the first set of rules comprises inverse kinematic logic functionality and is configured to predict motion of some first nodes even if their respective tracked coordinate is not directly tracked, and wherein the inverse kinematic logic functionality infers positions of intermediate body parts, and predictive logic infers a continued motion at a continuous velocity.

In yet another aspect of the present invention, the method of computer animating captured images includes method of computer animating captured images includes obtaining a first set of rules that define a first body part of the animatable captured image, wherein the first body part is defined by a bounding box, and wherein a center of the bounding box is a first node; obtaining a timed data file of a moving body having one or more tracked coordinates of two or more second body parts of said moving body, wherein the timed data file of a moving body is a video output of a user; evaluating the one or more tracked coordinates against the first set of rules to determine a respective tracked coordinate for the first node; and applying synchronized movement to the first node by mirroring each respective tracked coordinate to produce animation control of the one or more animatable captured images, wherein the evaluation of the one or more tracked coordinates against the first set of rules comprises inverse kinematic logic functionality and is configured to predict motion of the first nodes even if their respective tracked coordinate is not directly tracked, and wherein the inverse kinematic logic functionality infers positions of intermediate body parts, and predictive logic infers a continued motion at a continuous velocity.

These and other features, aspects and advantages of the present invention will become better understood with reference to the following drawings, description and claims.

DETAILED DESCRIPTION OF THE INVENTION

Figure 1:
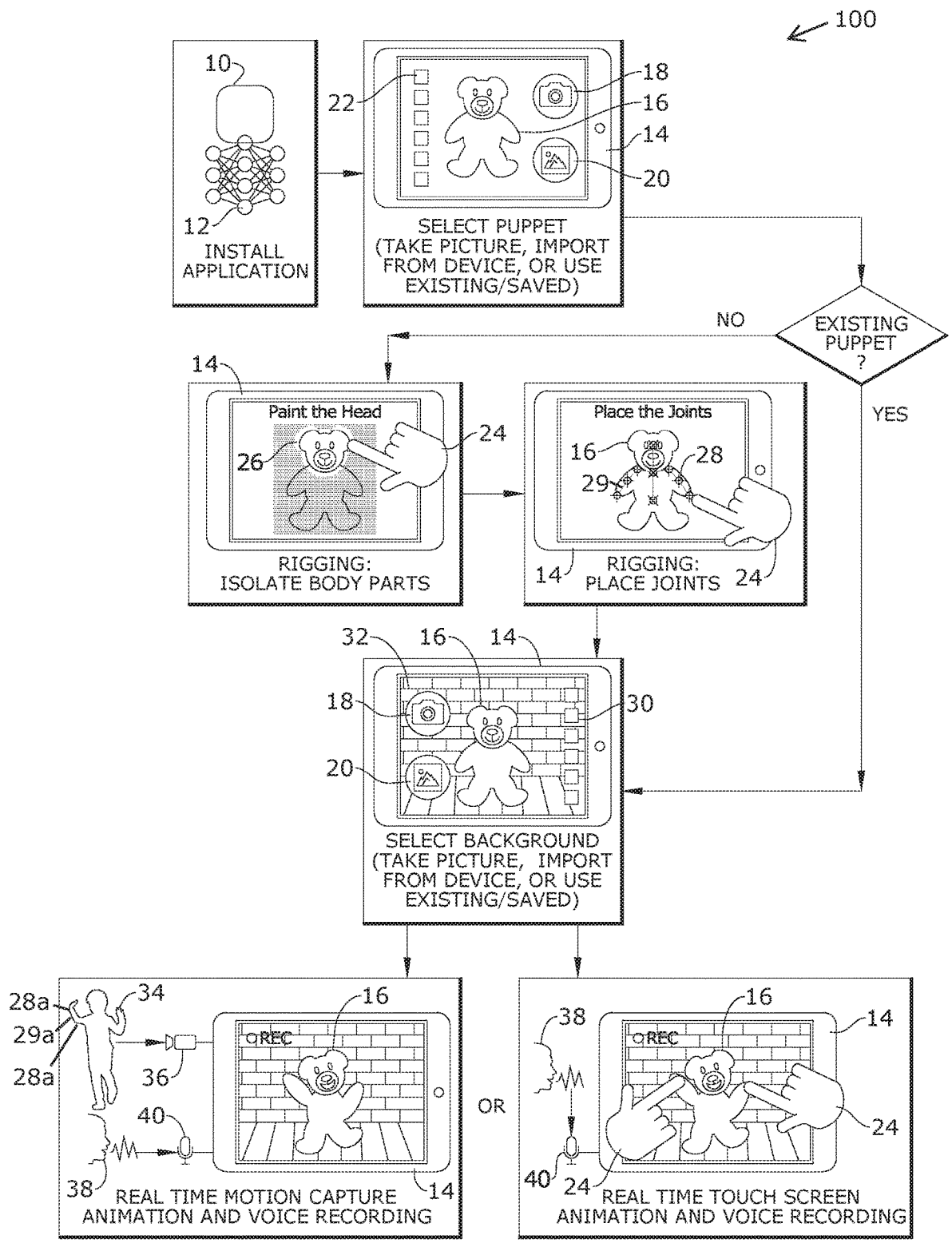
FIG. 1 is a perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method for the computer animation of captured images, wherein the computer animation of the captured image may be operatively rigged via touchscreen input or synchronized with video and audio input.

Referring now to FIGS. 1 through 4, the present invention may include at least one computing device with a touchscreen-based user interface 24. The touchscreen 24 being an input-output device layered on the top of the electronic user interface, which is also a visual display, so that user can give input or control the computing device through touching the screen with one or more fingers or a stylus. The computing device 14 may include at least one processing unit coupled to a form of memory including, but not limited to, a server, a desktop, laptop, and smart device, such as, a tablet and smart phone. The computing device 14 includes a program product including a machine-readable program code for causing, when executed, the computing device 14 to perform steps. The program product may include software which may either be loaded onto the computing device 14 or accessed by the computing device 14. The loaded software may include a software application 10 on a smart device. Or the software application 10 may be accessed and downloaded via app store on a mobile device. The software application 10 may be accessed by the computing device 14 using a web browser. The computing device 14 may access the software via the web browser using the internet, extranet, intranet, host server, internet cloud and the like.

The captured image animation system 100 embodies a computing device 14 is adapted to receive and import animatable captured images 16. The computing device 14 may be configured with a character rigging module operatively associated with the touchscreen 24 or another input-output device, like a mouse so as to define points of animation along said animatable captured images 16. The computing device 14 may be configured for motion capture, through a video and audio input device, such as a camera 18, video 36 and/or microphone 40, whereby the systemic output of the present invention operatively synchronizes the animated captured image to the motion capture, as defined by the rigged points of animation.

The computer implemented method embodied by the captured image animation system 100 utilizes the following steps. A user imports an animatable captured image 16, for example a photo of a drawing, toy, person, or any object they want to animate, including, but not limited to, photography of a collection of objects arranged the way they want, and from any angle. The user may also import a background captured image 32. The user may retrievably store the animatable captured image 16 and/or the background captured image 32 in operatively associated animatable image libraries 20/22 and/or the background image libraries 30, respectively, residing in the memory of the computer, or retrieved from a remote database. The animatable captured image 16 may be captured via the computer camera 18, or otherwise created directly through the computing device 14. Additionally, the user may export the animation as a video they can save and share. Different background captured image 32 can also be imported and used, and the user can switch among a plurality of animatable captured image 16 and background captured image 32 at will. Also, the backgrounds can be composed of animatable captured image 16. In some embodiments, backgrounds could be animated videos imported by the user and replayed during recording and playback.

The user may scale/move/rotate the animatable captured image 16 and/or the background captured image 32 to their liking. In certain embodiments, a back-side version of the artwork or object (animatable captured image 16) may be imported by the user, or generated by the software application 10. The present invention enables doing side facing angles as well, either by the user or generated by the software application 10, and interpreting the puppet as 3D that can be shown from multiple angles. In some embodiments, proper may be added as well.

Then the user rigs the captured image 16 via the character rigging module, marking the body parts and joints/nodes/pivot points 28 via the touchscreen 24 with simple instructions and hints the software application 10 provides. In certain embodiments, the software application 10 may automatically place the joint/nodes 28. The software application 10 may define isolated "body parts" 26 as the connection/vector 29 between two adjacent joints 28, such as the head of the captured image 16, as illustrated in FIG. 1. Or, it may define continuously connected body parts such that the body can be deformed to perform the captured animation. The "joints"/nodes 28 the user rigs may be, for some body parts, the pivot point of that body part.

Note, the "body part" 26 may be a part of the captured image 16, which can be any shape or size, and moves sometimes relative to an associated vector 29, sometimes to a single joint 28, and sometimes in some other way based on one or more joints 28. It can also be offset from the bone/vector 29 or joint 28 in various ways, not necessarily exactly on top of them, depending what makes sense for that puppet/captured image 16. It's not a trivial one-to-one mapping process, because the puppet design can be arbitrary, which is an advantage of the present invention, and the puppet is typically not the same shape as the person being tracked. Plus, it may have other body parts like a tail or wings. Accordingly, the software application embodied in the present invention makes various calculations to rig this arbitrary design to the tracked person's structure. All of these joints or points of interest can be calculated by the application automatically, or positioned by the user either instead of automatic calculation or as an adjustment after automatic calculation. Methods can be combined, with some points calculated by the application and others positioned by the user. The points that a user sees and can adjust are in some cases pivot points, for example a shoulder, and in other cases ends of rig bones, for example a hand, or any other point that is intuitive and useful to the user and helpful to the application in rigging the puppet. For example: A left shoulder joint may be calculated as the mid-point between the top right point of the bounding box of the upper left arm and the top left point of the bounding box of the chest. The bounding box is the box with the smallest measure (area, volume, or hypervolume in higher dimensions) within which all the points lie, and so provides coordinates of the rectangular border that fully encloses the body part/digital image when it is placed over a bidimensional background. The shoulder joint may be used as the pivot point for the corresponding upper arm. An elbow joint may be used as the pivot point for the corresponding forearm. A hand point may be used as the end of a bone representing the corresponding forearm, which starts at the corresponding elbow joint and ends at the hand point and defines the rotation of the corresponding forearm. A hip joint may be used as the pivot point for the corresponding thigh. A knee joint may be used as the pivot point for the corresponding calf. The center of the bounding box of the head may calculated by default as the "head joint", and the user can adjust it elsewhere. The head joint can be used as the end of a bone connecting the base of the neck to the head, the bone being a vector defining the direction of the head rotation as well as the distance between the center of the bounding box of the head and the top-center of the bounding box of the chest. The bounding boxes and directions described in the examples above relate to the puppet as it is in a default upright position.

Figure 2:
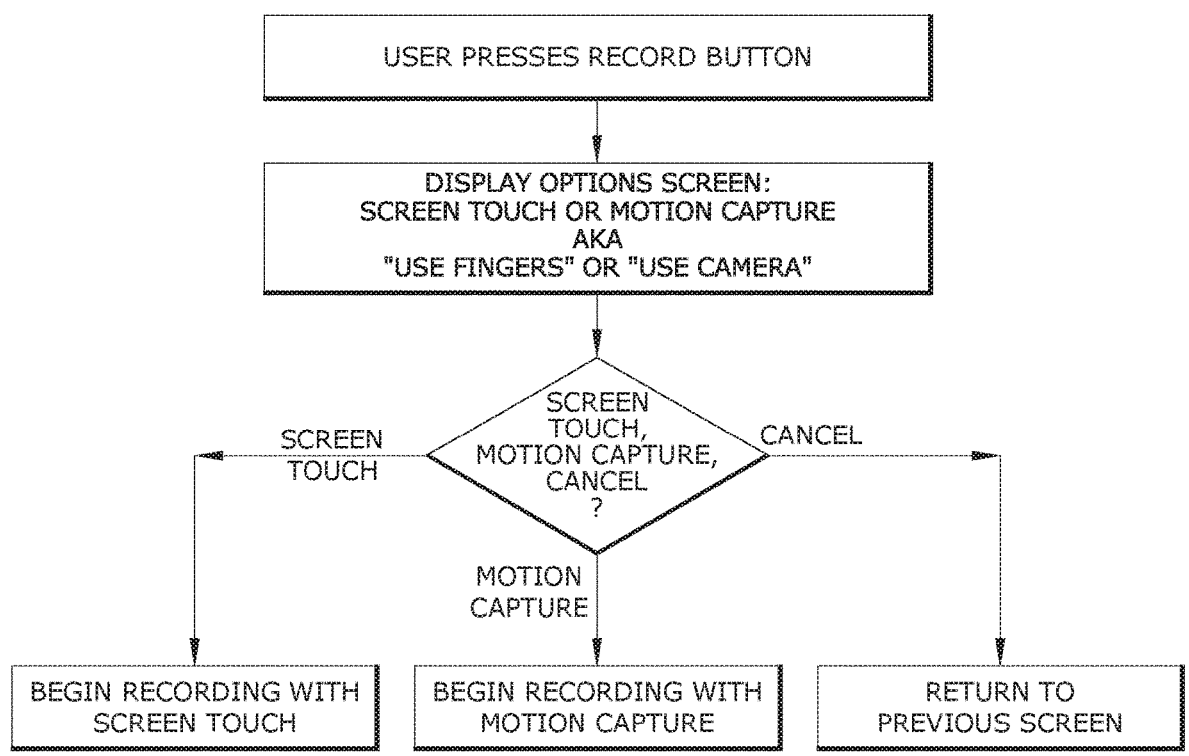
FIG. 2 is a flow chart view of a selection of animation type of an exemplary embodiment of the present invention.
Figure 3:
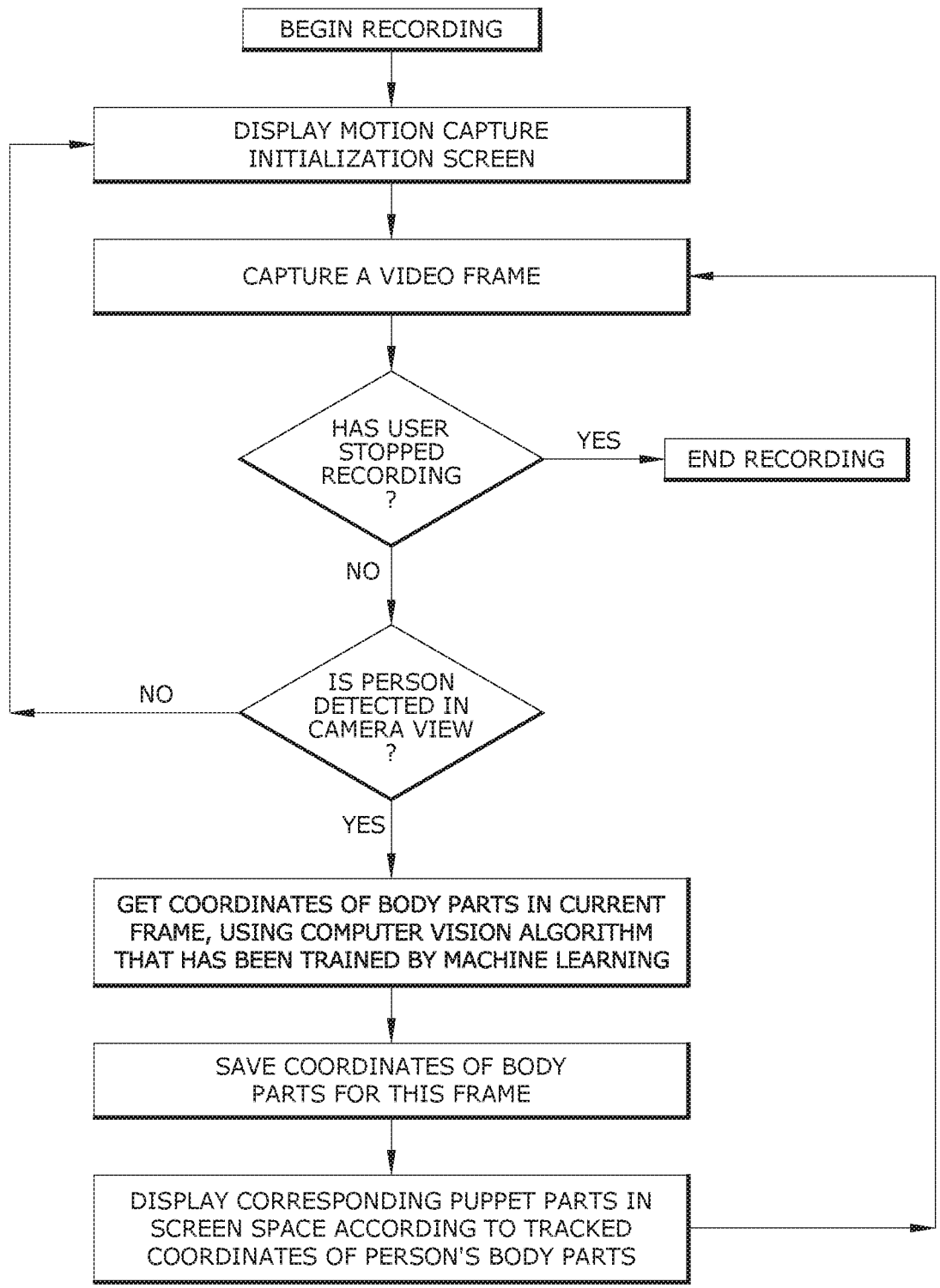
FIG. 3 is a flow chart view of a motion capture animation of an exemplary embodiment of the present invention.
Figure 4:
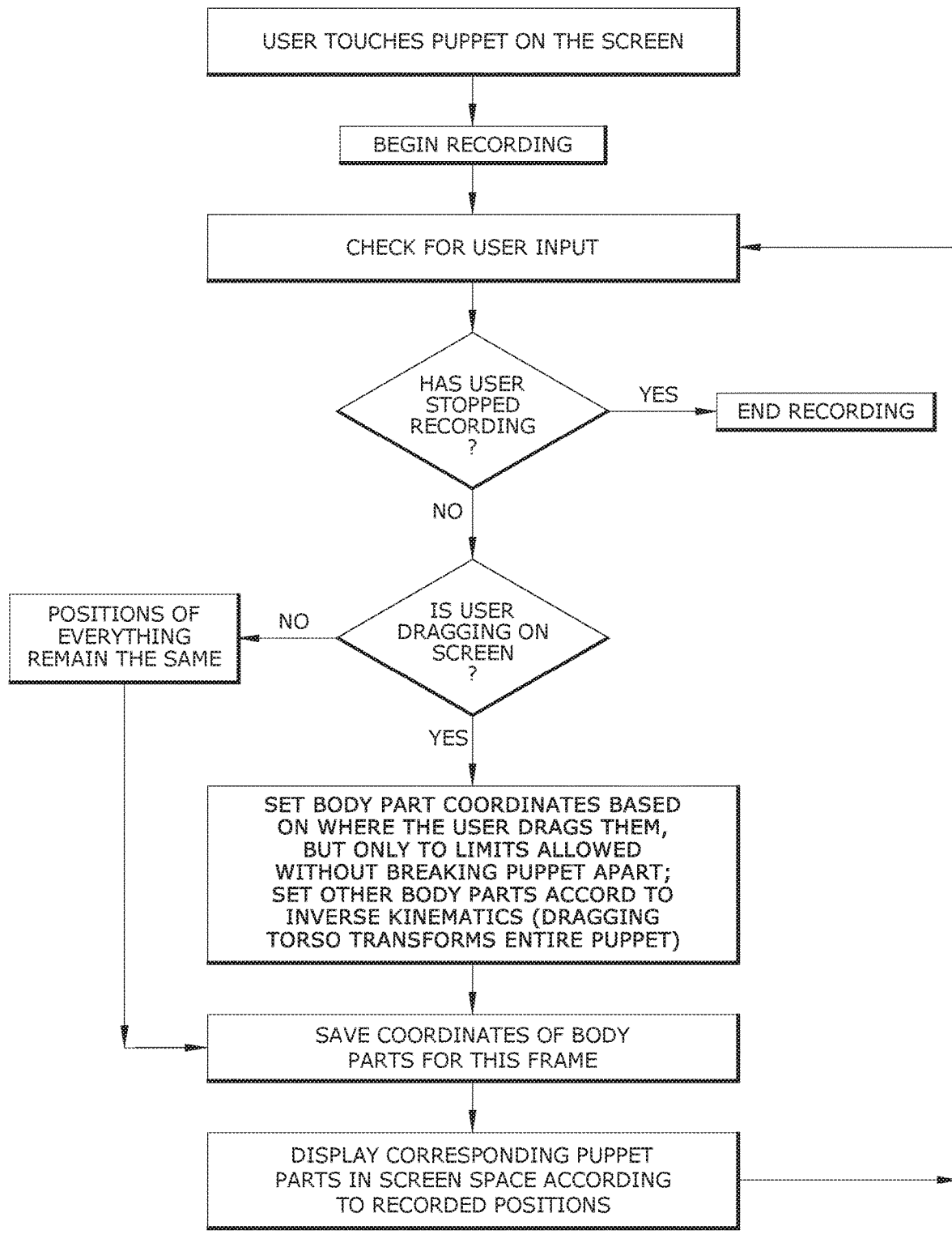
FIG. 4 is a flow chart view of a screen touch animation of an exemplary embodiment of the present invention.

Referring to the flowchart on FIGS. 2 through 4, the recording stage module can be initiated wherein the user stands in front of the computer camera and may begin to record their movement, and immediately see via the user interface/visual display an electronic representation of the captured image 16 moving just like user's captured movement video input 34, or similar to the user's movement with some adjustment as may be necessary by limitations of the captured image 16 or the device's current performance and capabilities. The recording stage module may include the following steps: displaying motion capture initialization screen. After capturing a video frame associated with the movement video input 34, and determining that the user is still recording, the recording stage module detects if the user is in camera view. Then the recording stage module receives coordinates of body parts in current frame using computer vision algorithm that has been trained by machine learning 12. The recording stage module saves the coordinates of the recorded body motion of the motion captured movements 34 and thus their equivalent vectors 29a and pivot points 28a (which correspond to the vectors 29 and pivot points 28 of the animatable captured image) for each frame. The recording stage module displays corresponding body parts in screen space according to tracked coordinates of the user's body parts but also taking into account the shape of the puppet, whereby the recording stage module loops back. For example: When the user raises their right arm and waves their hand, the screen-right arm of the puppet will raise as well as a mirror image of the user's movement, and the puppet will wave its hand as well. The position of the user's shoulder, elbow and hand are recorded. The vector of the puppet's upper arm at any given moment, or any given frame, may be defined as a mirror image of the vector from the captured user position of shoulder and elbow. The length of the puppet's upper arm may remain constant as to maintain the integrity and scale of the puppet, or may be proportionally consistent but scaled according to overall puppet size in the current frame. The direction of the puppet's forearm may be defined by the vector between the recorded positions of user's elbow and hand. The length of the puppet's forearm may remain constant or proportionally consistent. The position of the puppet's forearm may be defined by placing the start of its vector at the current position of the puppet's elbow. Thus, the puppet forearm may be parented to the upper arm (or in other words, the puppet forearm depends from the upper arm, which in turn depends from the chest). The upper arm may be similarly parented to the chest, which is similarly parented to the pelvis. The puppet head may be parented to the chest. Overall: The puppet body parts may be hierarchically connected such that the "root" point is the pelvis center, and all body parts at a given moment, in a given frame, may be oriented according to vectors between body parts captured from the user's position in front of the camera, and their sizes may be proportionally consistent with the original captured image that was rigged into a puppet. When the user moves their whole body such as walking from side to side or jumping up and down, the puppet pelvis may move accordingly, at a distance proportional to the user's movement within the frame, and the entire puppet may follow this movement as the body parts are all directly or indirectly parented to the pelvis. Additional movement in the puppet such as secondary motion of passive elements like hair, squash and stretch effects, or movement of body parts not existing in a human such as tail or wings, may be added. Additionally, user-generated audio output 38 may be recorded via the audio input device 40 and the animatable captured image 16 may move its mouth lip-synced to said audio output 38 if the user has opted to define a mouth during rigging or if the application is able to automatically define one. Even with no lip sync the audio may be captured and will be synchronized with the movement as performed by the user.

In certain embodiments, the user may utilize other forms of motion inputted via touchscreen-based movement or other input device as opposed to motion captured movements 34. The user can animate with touching and dragging on the touchscreen 24, including multi touch with as many fingers as they want, each finger can set and manipulate the joint/node 28, the vector 29, the isolated body part 26 or the entire puppet. Multiple users can do this at once. A user may, for instance, drag the pelvis of a puppet (the animatable captured image 16), which moves the whole puppet along the user interface/visual display, and then with another finger drag the puppet's hand, which makes the hand and arm move but without breaking the puppet, and the elbow will bend in a natural way using logic that includes inverse kinematics. Users can simultaneously move the head too, and make the puppet bend over.

During animation with screen touch, scaling the puppet (the animatable captured image 16), for example, up and down, includes making it appear to go further away and come back. Rotating enables turning the puppet upside down or to their backside and by, in certain embodiments, incorporating a back-side version or other angles of the artwork or object (animatable captured image 16) the user imports. During animation with motion capture, in some embodiments where hardware provides depth data, the motion tracking can be much more accurate in 3 dimensions and be used for more accurate tracking in 3 dimensions. If only 2 dimensional data is available, other logic may be used. For example, the puppet may show its backside when the user is tracked but the user's face is not tracked, implying the user's back is turned to the camera. Alternatively, some visual effect implying spinning may be used to symbolize the user having turned around. Detailed facial motion capture and shortened horizontal scale may be used as a basis for turning the puppet sideways at various angles. And overall changes in horizontal scale which indicate the user getting closer to or further from the camera may trigger scaling the puppet to show moving closer to or further from the camera.

In certain embodiments, a user can control multiple puppets (e.g., two animatable captured images 16) at any given time and animate them either simultaneously or one at a time, using screen touch or video motion capture. They may tap the puppets, during screen touch, or use their own position, during motion capture, to define which puppet is the active speaker at that moment, whose mouth should move lip syncing with recorded sound.

The present invention includes inverse kinematic logic functionality. The inverse kinematic logic functionality predicts where some joints 28 or body parts 26 are even if they are not directly tracked. For instance, when a hand goes around in circles, and the corresponding shoulder is in a certain position, the corresponding elbow must be in a certain position each moment in order for the arm to remain intact. Additionally, the present invention could guess where the foot is when the foot is off camera, by tracking it when it's on camera and inferring a continued motion at the same velocity until the knee position that is on camera indicates that the foot is likely to have changed velocity, or assuming foot positions that are logically consistent with current center of gravity of upper body. The present invention may be adapted to base many predictions of nodes 28 and body parts 26 on the head and hands being tracked, when tracking of other body parts is not available (off screen or too heavy for the particular device to track).

The software application 10 allows users to switch between animatable captured images 16, while retaining the same recorded animation performance by saving the motion captured data (captured movement video input 34) independently, either the positions of the user's body parts in the captured video or the positions of all the puppet body parts and joints, even from an animated video featuring a different animated captured image 16 based off of said data. The present invention can do all sorts of interesting things with this data—like exporting it to other software packages. The user does not just get the one specific "puppet show", but also the motion captured data. Likewise, the audio is also recorded independently. Similarly, users can through the software application 10 switch backgrounds and replay the same animation so the same captured performance can be reused with different captured images on different backgrounds.

A method of using the present invention includes the following. The captured image animation system 100 disclosed above may be provided. A user selects an animatable captured image 16 they want to animate, then rigs it as described above, and then may associate background captured images 32 thereto. Then the user may capture movement input 34 by standing in front of the device video input 36, acting out and speaking their animation, thereby animating their captured image 16 (artwork, crafts, toys, or anything they photograph) into a digital "puppet show". Additionally, visual effects, sound effects, and more ways of moving the character may be incorporated into the final presentation. Some examples of using the resulting animations may include exercise instruction or tracking, dance instruction, Mo cap for 3D animation, controlling a virtual avatar in a game, or any type of audio/visual presentation such as a video, animation, presentation, fiction or non-fiction, tv show, commercial, etc. Another user example would be educational purposes, such as a web portal where teachers log in, select a grade level and certain academic standards, and receive some lesson plans or units (which span several lessons) that achieve these goals through projects performed with the software application, including instructions for teacher to wrangle the kids to do the project, tutorials for the kids, suggested rubrics for grading, and more. This could also come through the software application 10, and could be individual tutorials for fun projects or complete curriculums or anything in between. Another example would be visual effects professionals or animation professionals using the application to animate in real time in front of clients or to quickly iterate on versions to show clients, or to capture animations and then exporting into more professional software to continue work. The invention may be used to animate more than characters, for instance logos and props and special effects, using motion capture or screen touch input with additional logic that may be applied by the software to interpret the user's movements.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method of computer animating captured images, comprising:
   obtaining a first set of rules that define one or more first nodes as a function of two or more first body parts of one or more animatable captured images;
   obtaining a timed data file of a moving body having one or more tracked coordinates of two or more second body parts of said moving body;
   evaluating the one or more tracked coordinates against the first set of rules to determine a respective tracked coordinate for each first node; and
   applying synchronized movement to each first node by mirroring each respective tracked coordinate to produce animation control of the one or more animatable captured images;
   the first set of rules comprise defining a relationship between two adjacent first nodes as a vector, wherein each vector establishes a relative directional orientation of the two adjacent first nodes when applying synchronized movement.

2. The method of claim 1, wherein the timed data file of a moving body is a video output of a user.

3. The method of claim 1, wherein the first set of rules comprises one or more touchscreen gestures defining each first node.

4. A method of computer animating captured images, comprising:
obtaining a first set of rules that define one or more first nodes as a function of two or more first body parts of one or more animatable captured images;
obtaining a timed data file of a moving body having one or more tracked coordinates of two or more second body parts of said moving body;
evaluating the one or more tracked coordinates against the first set of rules to determine a respective tracked coordinate for each first node; and
applying synchronized movement to each first node by mirroring each respective tracked coordinate to produce animation control of the one or more animatable captured images, wherein the first set of rules further comprises defining a root first node, wherein a vector is defined by the root first node and the one or more first nodes when applying synchronized movement.

5. The method of claim 4, wherein the first set of rules further comprises defining a hierarchically connection between the root first node and the one or more first nodes, wherein the synchronized movement of the one or more first nodes depends from the root first node.

6. A method of computer animating captured images, comprising:
obtaining a first set of rules that define one or more first nodes as a function of two or more first body parts of one or more animatable captured images;
the first set of rules comprising:
defining one or more first body parts of the animatable captured image by one or more bounding boxes defined by the one or more first nodes;
obtaining a timed data file of a moving body having one or more tracked coordinates of two or more second body parts of said moving body, wherein the timed data file of a moving body is a video output of a user;
evaluating the one or more tracked coordinates against the first set of rules to determine a respective tracked coordinate for each first node; and
applying synchronized movement to each first node by mirroring each respective tracked coordinate to produce animation control of the one or more animatable captured images.

7. The method of claim 6, wherein the inverse kinematic logic functionality infers a continued motion at a continuous velocity.

8. The method of claim 6, wherein the first set of rules further comprises defining a root first node, wherein a vector is defined by the root first node and the one or more first nodes when applying synchronized movement.

9. The method of claim 8, wherein the first set of rules further comprises defining a hierarchically connection between the root first node and the one or more first nodes, wherein the synchronized movement of the one or more first nodes depends from the root first node.

10. The method of claim 6, wherein the first set of rules further comprises defining a first body part of the animatable captured image, wherein the first body part is defined by a bounding box, and wherein a center of the bounding box is calculated as the one or more first nodes.

11. A method of computer animating captured images, comprising:
obtaining a first set of rules that define a first body part of the animatable captured image, wherein the first body part is defined by a bounding box, and wherein a center of the bounding box is a first node;
obtaining a timed data file of a moving body having one or more tracked coordinates of two or more second body parts of said moving body, wherein the timed data file of a moving body is a video output of a user;
evaluating the one or more tracked coordinates against the first set of rules to determine a respective tracked coordinate for the first node; and
applying synchronized movement to the first node by mirroring each respective tracked coordinate to produce animation control of the one or more animatable captured images,
wherein the evaluation of the one or more tracked coordinates against the first set of rules comprises inverse kinematic logic functionality is configured to predict motion of the first nodes even if their respective tracked coordinate is not directly tracked.

* * * * *